(12) United States Patent  (10) Patent No.: US 7,021,101 B2
Spiegelberg  (45) Date of Patent: Apr. 4, 2006

(54) METHOD AND APPARATUS FOR MANUFACTURING A BATTERY TERMINAL WITH UNDERCUT RINGS

(75) Inventor: Bernard N. Spiegelberg, Germantown, WI (US)

(73) Assignee: Tulip Corporation, Milwaukee, WI (US)

( * ) Notice: Subject to any disclaimer, the term of this patent is extended or adjusted under 35 U.S.C. 154(b) by 140 days.

(21) Appl. No.: 10/615,073

(22) Filed: Jul. 8, 2003

(65) Prior Publication Data

US 2004/0003640 A1    Jan. 8, 2004

Related U.S. Application Data

(63) Continuation of application No. 09/881,261, filed on Jun. 14, 2001, now Pat. No. 6,644,084.

(51) Int. Cl.
*B21B 15/00* (2006.01)

(52) U.S. Cl. ............................. 72/126; 72/112; 72/125

(58) Field of Classification Search .................... 72/71, 72/102, 103, 104, 108, 112, 115, 118, 122, 72/123, 125, 126
See application file for complete search history.

(56) References Cited

U.S. PATENT DOCUMENTS

| 4,168,618 | A | * | 9/1979 | Saier et al. ..................... 72/71 |
| 4,426,870 | A | * | 1/1984 | Toropov et al. ............... 72/118 |
| 4,491,002 | A | * | 1/1985 | Toropov et al. ............... 72/118 |
| 4,942,752 | A |   | 7/1990 | Helfman |
| 5,364,714 | A |   | 11/1994 | Gurtler |
| 5,606,887 | A |   | 3/1997 | Spiegelberg et al. |
| 5,632,173 | A |   | 5/1997 | Spiegelberg et al. |
| 5,655,400 | A |   | 8/1997 | Spiegelberg et al. |
| 5,791,183 | A |   | 8/1998 | Spiegelberg et al. |
| 6,195,860 | B1 | * | 3/2001 | Di Rosa et al. ............ 29/33 R |
| 6,216,510 | B1 | * | 4/2001 | Hashimoto ................... 72/103 |
| 6,298,703 | B1 |   | 10/2001 | Focken et al. |
| 6,644,084 | B1 | * | 11/2003 | Spiegelberg ................. 72/126 |

FOREIGN PATENT DOCUMENTS

| DE | 4241393 C | 7/1994 |
| EP | 0601268 B1 | 5/1993 |

OTHER PUBLICATIONS

Fette Tool Systems, Inc. "Fette Thread Rolling systems" promotional materials printed in Germany, 10 pgs.
Advertisement from Dionys Hofmann GmbH, "High Quality Battery Terminals", 1 pg.
Advertisement from Dionys Hofmann GmbH, "Battery Terminals—The Source of Power", 1 pg.

* cited by examiner

*Primary Examiner*—Ed Tolan
(74) *Attorney, Agent, or Firm*—Foley & Lardner LLP (57) ABSTRACT

A method and apparatus utilizing a radial rolling process to cold form rings on a lead battery terminal with undercuts or overhangs to improve the sealing properties of the rings. The apparatus includes a fixture configured to securely position the battery terminal beneath a rolling station. The rolling station includes a radial rolling spindle having a plurality of cam shaped rollers configured to transform at least one ring on the battery terminal from having an initial rectangular cross-sectional shape into a desired arrowhead cross-sectional shape when the terminal and cold metal forming member are rotated relative to each other. A drive assembly is configured to rotate the battery terminal and radial rolling head relative to each other.

17 Claims, 8 Drawing Sheets

METHOD AND APPARATUS FOR MANUFACTURING A BATTERY TERMINAL WITH UNDERCUT RINGS

CROSS REFERENCE TO RELATED APPLICATIONS

The present application is a continuation of U.S. patent application Ser. No. 09/881,261, filed Jun. 14, 2001 now U.S. Pat. No. 6,644,084, titled "Method and Apparatus for Manufacturing a Battery Terminal with Undercut Rings" and is incorporated by reference herein.

FIELD OF THE INVENTION

The present invention relates generally to an apparatus and method for cold forming of a ring on a lead battery terminal. More specifically, the invention relates to an apparatus and method for radial rolling undercut rings on a lead battery terminal.

BACKGROUND OF THE INVENTION

In general, battery terminals are utilized as an interface between a sealed battery container and an external device seeking electrical power. In sealed batteries containing liquid electrolyte, the battery terminal must be configured to prevent leakage of electrolyte to ensure the battery will not fail prematurely when called upon. This is especially important in today's business environment where such batteries are relied upon as power backups for large banks of computers. To prevent leakage of electrolyte around a battery terminal it is common to provide a plurality of annular rings extending around the head of the battery terminal, which is designed to be embedded in the wall of the container.

Battery terminals including annular rings on the head are typically formed from lead in a cold or hot forming process. In the hot forming process, a lead alloy is heated until it is in a molten state. The molten lead is then poured into a mold or casting and formed into a partially-finished or finished battery terminal. In the cold forming process a lead slug (typically at room temperature) is subjected to various pressing, punching and machining operations to create the finished battery terminal.

As mentioned above, the hot forming process requires that the lead be heated until it reaches the molten state and then subsequently poured into a multi-part mold until it cools. This is disadvantageous in that melting the lead alloy may create undesirable porosity in the finished battery terminal and is expensive to implement in an environmentally safe manner. In addition, the multi-part mold used in the hot forming process imposes design constraints on the battery terminal in that the various elements of the battery terminal must be shaped so that the battery terminal can be removed from the mold once the lead alloy has cooled. Thus, battery terminals formed by this process with annular rings must not include any undercuts or overhangs.

Existing methods of cold forming a battery terminal from a lead slug require a number of individual steps. In one known method a lead slug is first modified in a preform station and then subsequently formed into a finished battery terminal in a final forming press having a split die. Alternatively, in a second known method a lead slug is formed into a semi-finished battery terminal in a first station having a split die and then subsequently machined to create a finished battery terminal.

As with the multi-part molds of the hot forming process, the use of a split die to form a battery terminal with annular rings in the cold forming process limits the shape of the annular rings. In particular, the annular rings must not have any undercut or overhang because that would make it impossible to remove the battery terminal after forming is complete.

Most battery terminals formed today by the above-described processes have annular rings with substantially rectangular cross-sectional shapes because this simplifies manufacture thereof and thus reduces costs. It has been found, however, that annular rings having such simple profiles can result in leakage of electrolyte as the plastic material surrounding the battery terminal shrinks over time. By contrast, battery terminals having annular rings with undercuts or overhangs are less likely to leak as the plastic material shrinks over time because the more complex profile provides an improved labyrinth seal.

Consequently, it would be desirable to have a simplified process for cold forming a battery terminal with annular rings having undercuts or overhangs to improve sealing properties of the annular rings.

SUMMARY OF THE INVENTION

The present invention facilitates the manufacture of battery terminals that provide improved sealing properties for preventing leakage of electrolyte.

According to a first aspect of the invention, an apparatus for forming undercut rings on a lead battery terminal comprises a fixture, a rolling station and a drive assembly. The fixture is configured to securely position the battery terminal in the rolling station. The rolling station includes a cold metal forming member configured to transform at least one ring on the battery terminal from having a first shape into a second (different) shape with at least one undercut or overhang when the terminal and cold metal forming member are rotated relative to each other. The drive assembly is configured to rotate the terminal and cold metal forming member relative to each other.

According to another aspect of the invention, a method for forming undercut rings on a lead battery terminal includes the step of securing the battery terminal within a fixture. The method further includes the step of engaging a cold metal forming member with an outer surface of the lead battery terminal while the cold metal forming member and the battery terminal are rotating relative to each other. The method also includes the step of transforming a ring on the lead battery terminal from a first shape into a second (different) shape with at least one undercut or overhang.

According to another aspect of the invention, a method for forming a finished lead alloy battery terminal with at least one sealing ring having an undercut or overhang includes the step of securing a partial-finished battery terminal within a fixture. The partial-finished battery terminal includes at least one sealing ring lacking an undercut or overhang. The method further includes the step of engaging a cold metal forming member with the at least one sealing ring of the partial-finished battery terminal while the cold metal forming member and the partial-finished battery terminal are rotating relative to each other. The method also includes the step of reshaping the at least one sealing ring on the partial-finished battery terminal into a sealing ring on the finished battery terminal having at least one undercut or overhang without substantially removing any material.

These and other benefits and features of the invention will be apparent upon consideration of the following detailed description of preferred embodiments thereof, presented in connection with the following drawings in which like reference numerals identify like elements throughout.

DETAILED DESCRIPTION OF THE PREFERRED EMBODIMENTS

Figure 1:
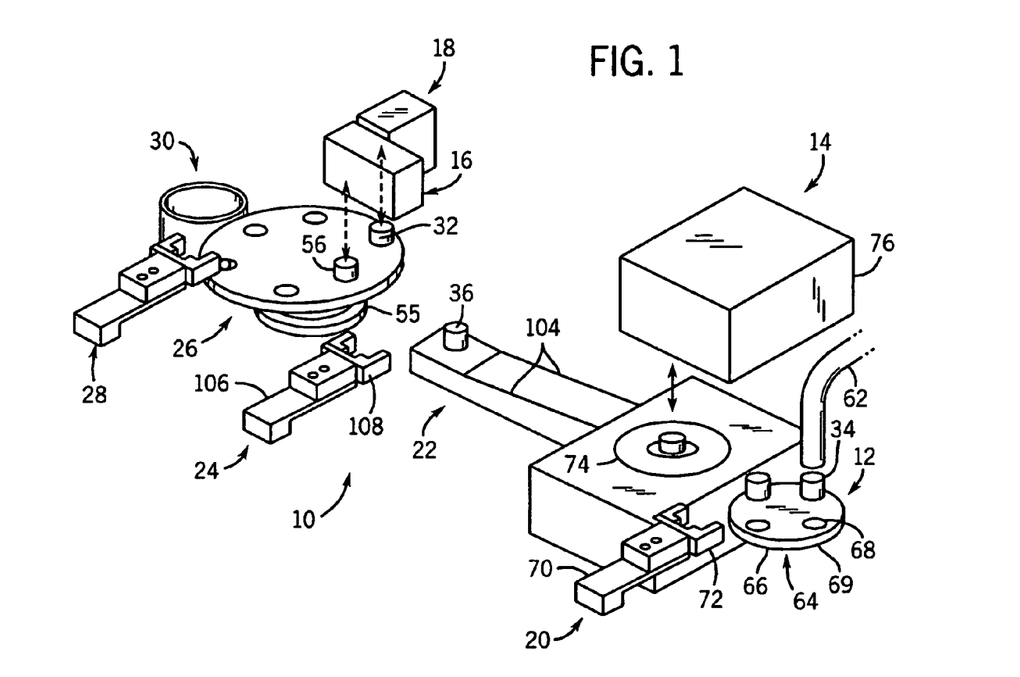
FIG. 1 is a schematic illustration of the lead slug pickup station, forming station, through punch station, radial rolling station, drop station and transfer mechanisms of the preferred embodiment.

Referring to FIG. 1, a battery terminal forming apparatus 10 includes four stations: a lead slug station 12, a forming station 14, a radial rolling station 16, and a through punch station 18. Additionally, apparatus 10 includes a first pick and place transfer mechanism 20, a vibratory transfer mechanism 22, a second pick and place transfer mechanism 24, an index (or fixture) assembly 26, a third pick and place transfer mechanism 28, and a drop station 30.

Figure 11A:
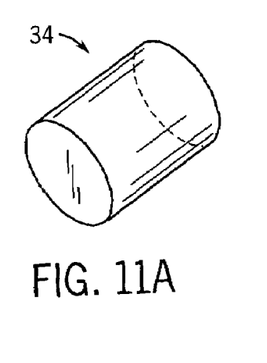
FIG. 11A is an isometric view of a lead slug.
Figure 11B:
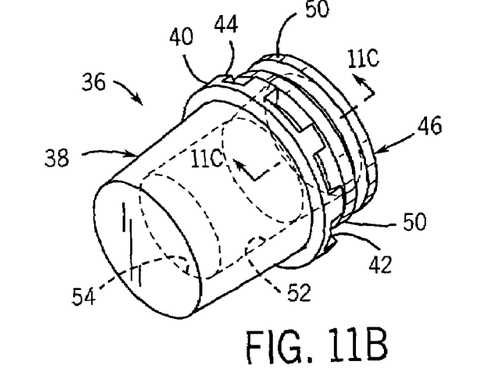
FIG. 11B is an isometric view of a semi-finished battery terminal after cold forming in a split die.

Apparatus 10 creates a finished battery terminal 32 (see FIG. 11F) from a lead slug 34 (see FIG. 11A). Lead slug 34 is first transferred from lead slug station 12 to forming station 14 with first pick and place transfer mechanism 20. In forming station 14, lead slug 34 is cold pressed into a semi-finished battery terminal 36 (see FIG. 11B) including a frustum 38 having a frusto-conical shape, a splined ring 40 having a plurality of splined ring recesses 42 and tabs 44, a head 46 having a base (or root) diameter surface 48 and a pair of annular raised rings 50 extending outwardly therefrom, and a tapered recess 52 having a flat wall 54.

Figure 11C:
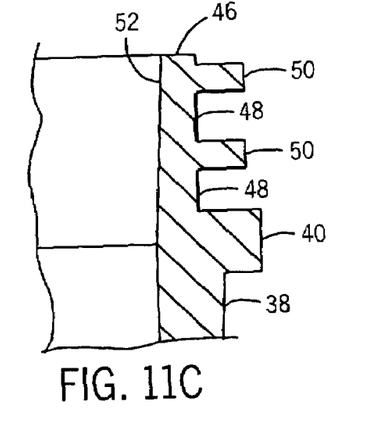
FIG. 11C is a cross-sectional view of the annular rings of the semi-finished battery terminal taken along line 11C—11C in FIG. 11B.

Referring to FIG. 11C, rings 50 include an inner portion having a first width and an outer portion having a second width. The inner portion being located between base diameter surface 48 and the outer portion of the ring 50. The first width being at least as wide as the second width.

Semi-finished battery terminal 36 is expelled from forming station 14 and positioned by vibratory transfer mechanism 22 for subsequent transfer by second pick and place transfer mechanism 24 to index assembly 26. Index assembly 26 is rotatably indexed by an index drive 55 such that semi-finished battery terminal 36 is positioned in radial rolling station 16.

Figure 11D:
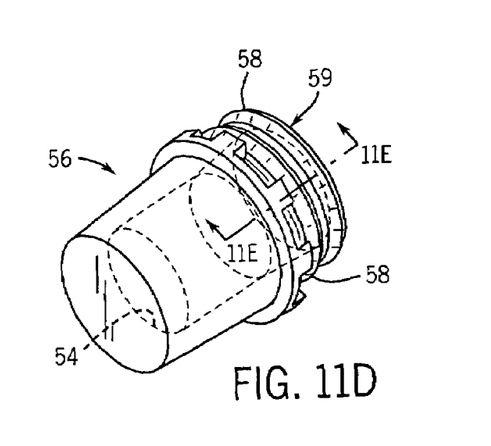
FIG. 11D is an isometric view of a near-finished battery terminal after radial rolling the annular rings into the desired arrowhead shape.
Figure 11E:
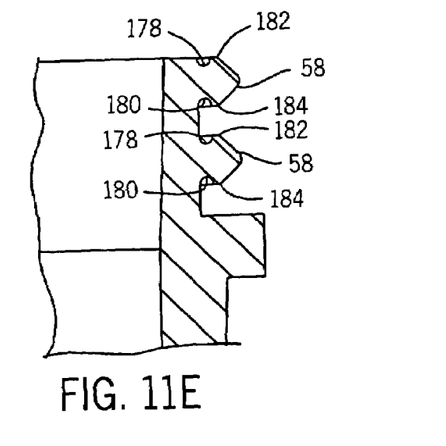
FIG. 11E is a cross-sectional view of the annular rings of the finished battery terminal taken along line 11E—11E in FIG. 11D.

In radial rolling station 16, semi-finished battery terminal 36 is cold roll formed into a near-finished battery terminal 56 (see FIG. 11D) having a head 57 with annular rings 58 that are arrowhead shaped in cross section. Finally, index assembly 26 positions near-finished battery terminal 56 in through punch station 18 for cold forming near-finished batter terminal 56 into finished battery terminal 32 (see FIG. 11F) having a throughhole tapered recess 60.

Referring now to FIGS. 1–10, battery terminal forming apparatus 10 and its manner of operation will be described in greater detail. Lead slug 34 is cut from a lead rod 62 and presented in lead slug station 12. Lead slug station 12 includes a transfer mechanism (e.g., a guide tube) to transfer lead slug 34 to an indexing turntable 64. Indexing turntable 64 includes a circular index plate 66 having a plurality of openings 68 which are closed at their lower ends by a bottom wall 69.

First pick and place transfer mechanism 20 includes an arm 70 and a gripper 72. Lead slug 34 is transferred from lead slug station 12 to forming station 14 by activation of arm 70 and gripper 72.

Figure 2:
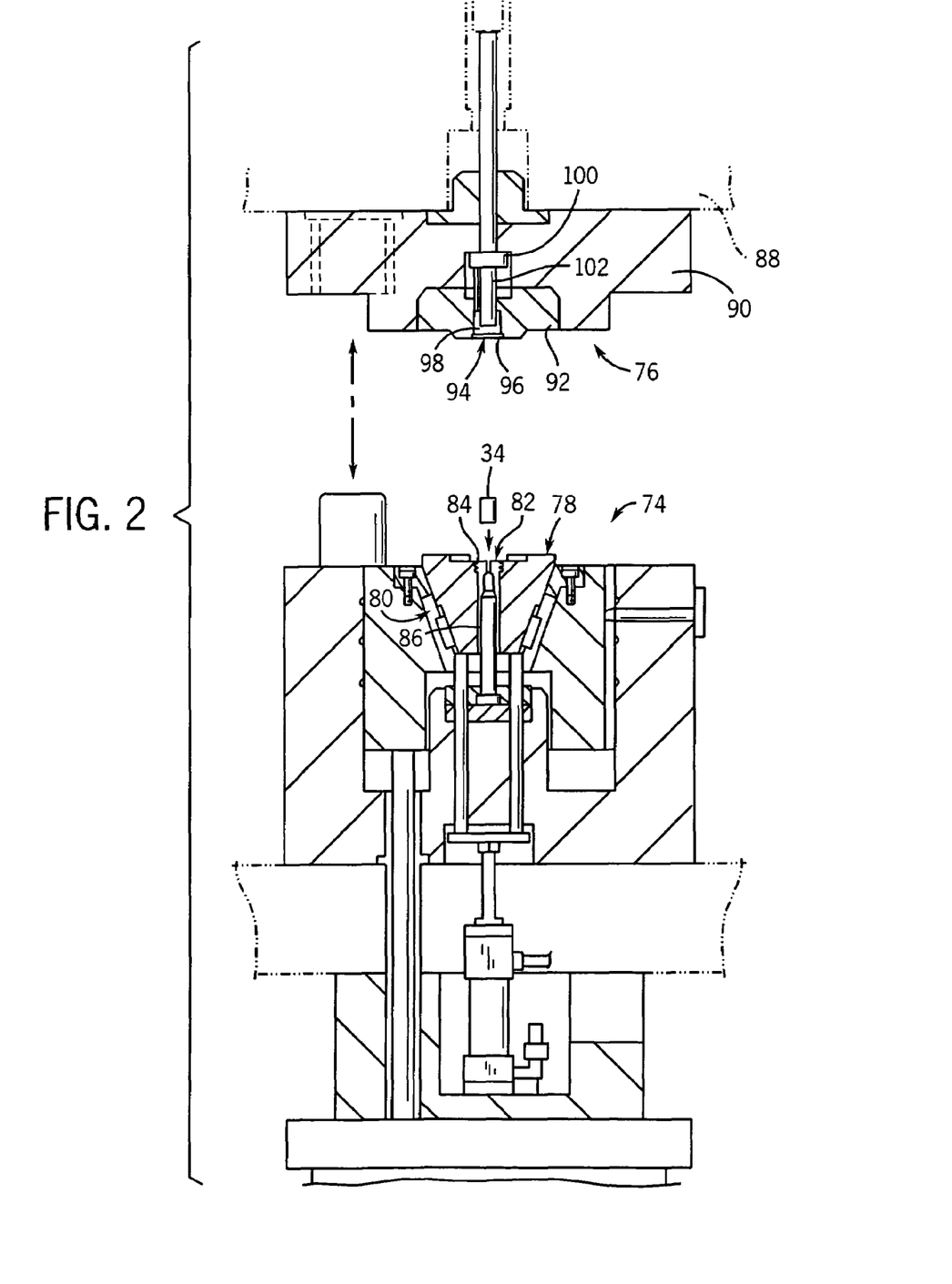
FIG. 2 is a cross-sectional view of the forming station in the open position.

As shown in FIG. 2, forming station 14 includes a lower die assembly 74 and an upper die assembly 76. Lower die assembly 74 includes a cone shaped split die 78 seated in a conical opening 80. When forming station 14 is activated, the two halves of split die 78 come together to form an upwardly opening cylindrical die cavity 82. Each half of split die 78 includes a pair of grooves 84 which define a portion of die cavity 82. Grooves 84 are substantially rectangular in cross-sectional shape with each corner typically having a small radius of curvature. Lower die assembly 74 further includes a forming punch 86 in alignment with die cavity 82.

Upper die assembly 76 includes a press ram 88 having a die plate 90 mounted on the bottom of ram 88. A die 92 is mounted on die plate 90. Die 92 includes a downwardly opening die cavity 94 having a relatively wide cavity opening 96 and an upper frusto-conical beveled area 98. A knockout bar assembly 100 is supported by the press ram 88. Knockout bar assembly 100 includes a rod 102 in alignment with beveled area 98 of upper die 76 and forming punch 86 of lower die 74. Further details of the structure of forming station 14 are provided in commonly owned U.S. Pat. No. 5,606,887 (see, in particular, FIGS. 2–4 and the accompanying text), the entire contents of which are hereby incorporated by reference.

Lead slug 34 is placed within upwardly opening cylindrical die cavity 82 formed by split die 78. When forming station 14 is activated, press ram 88 forces the lower face of die plate 90 to bear against the upper surface of split die 78, which causes the two halves of split die 78 to be wedged down into conical opening 80. As a result of this compression, lead slug 34 flows between split die 78, forming punch 86, forming cavity 94 and the lower end of rod 102. In this manner, lead slug 34 is formed into semi-finished battery terminal 36 (see FIG. 11B) including frustum 38 having the frusto-conical shape, splined ring 40 having the plurality of splined ring recesses 42 and tabs 44, head 46 having the pair of annular rings 50, and tapered recess 52 having flat wall 54.

As upper die assembly 76 is raised from contact with lower die assembly 74, semi-finished battery terminal 36 remains seated in forming cavity 94 of upper die 76. Semi-finished battery terminal 36 is released from die 92 by actuating knockout bar assembly 100, and a timed blast of compressed air is used to expel semi-finished battery terminal 36 from forming station 14.

Referring again to FIG. 1, semi-finished battery terminal 36 is deposited in vibratory transfer mechanism 22, where it is oriented between sidewalls 104 such that head 46 is facing up. Sidewalls 104 are spaced apart a distance less than the diameter of splined ring 40 on semi-finished battery terminal 36. Sidewalls 104 are angled downward and are vibrated to translate semi-finished battery terminal 36 toward the end of sidewalls 104. Second pick and place transfer mechanism 24 includes an arm 106 and a gripper 108 for transferring semi-finished battery terminal 36 from vibratory transfer mechanism 22 to an index die 110 located in index assembly 26.

Figure 3:
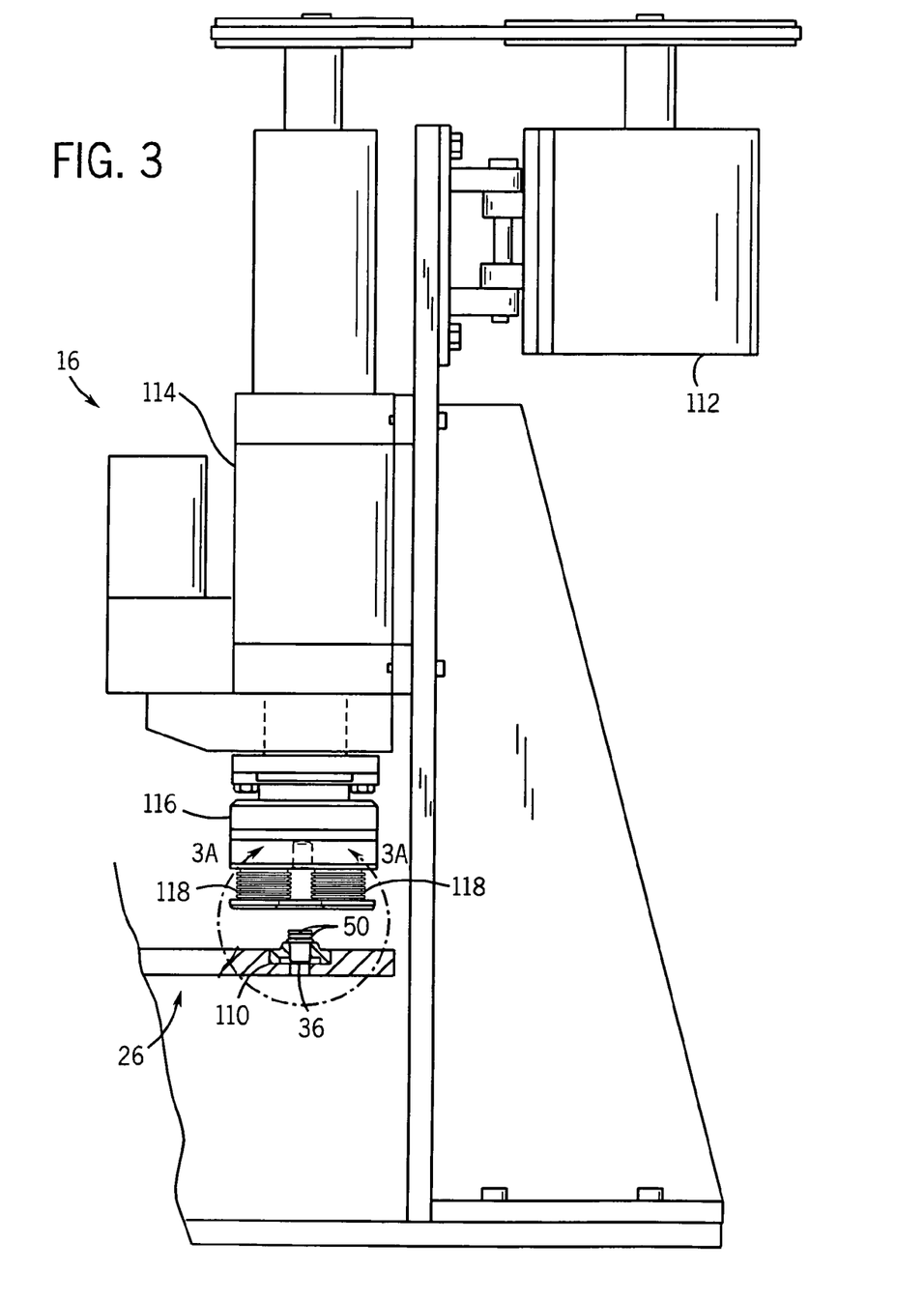
FIG. 3 is a side elevation view of the radial rolling station with the radial rolling spindle raised above the index assembly.
Figure 3A:
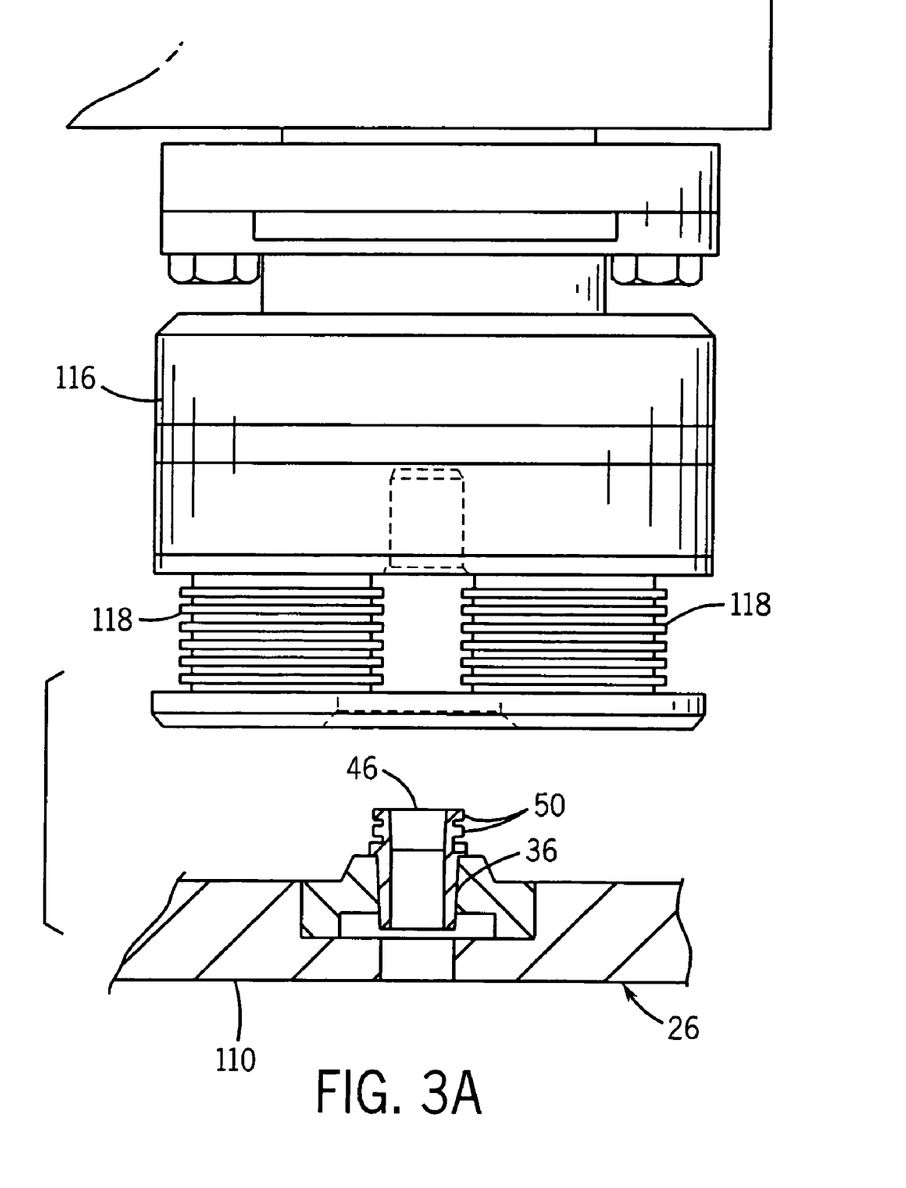
FIG. 3A is an enlarged partial cross-sectional view of the radial rolling spindle and index assembly taken along line 3A—3A in FIG. 3.

Turning now to FIGS. 3 and 3A, radial rolling station 16 includes a motor 112, a drive assembly 114, and a radial rolling spindle 116. Radial rolling spindle 116 includes three cam-shaped rollers 118 (see FIG. 5) having outer diameters configured for transforming semi-finished battery terminal 36 into near-finished battery terminal 56. Radial rolling spindle 116 is mounted above the edge of circular index assembly 26 in alignment with index die 110 and head 46 of semi-finished battery terminal 36.

Figure 4:
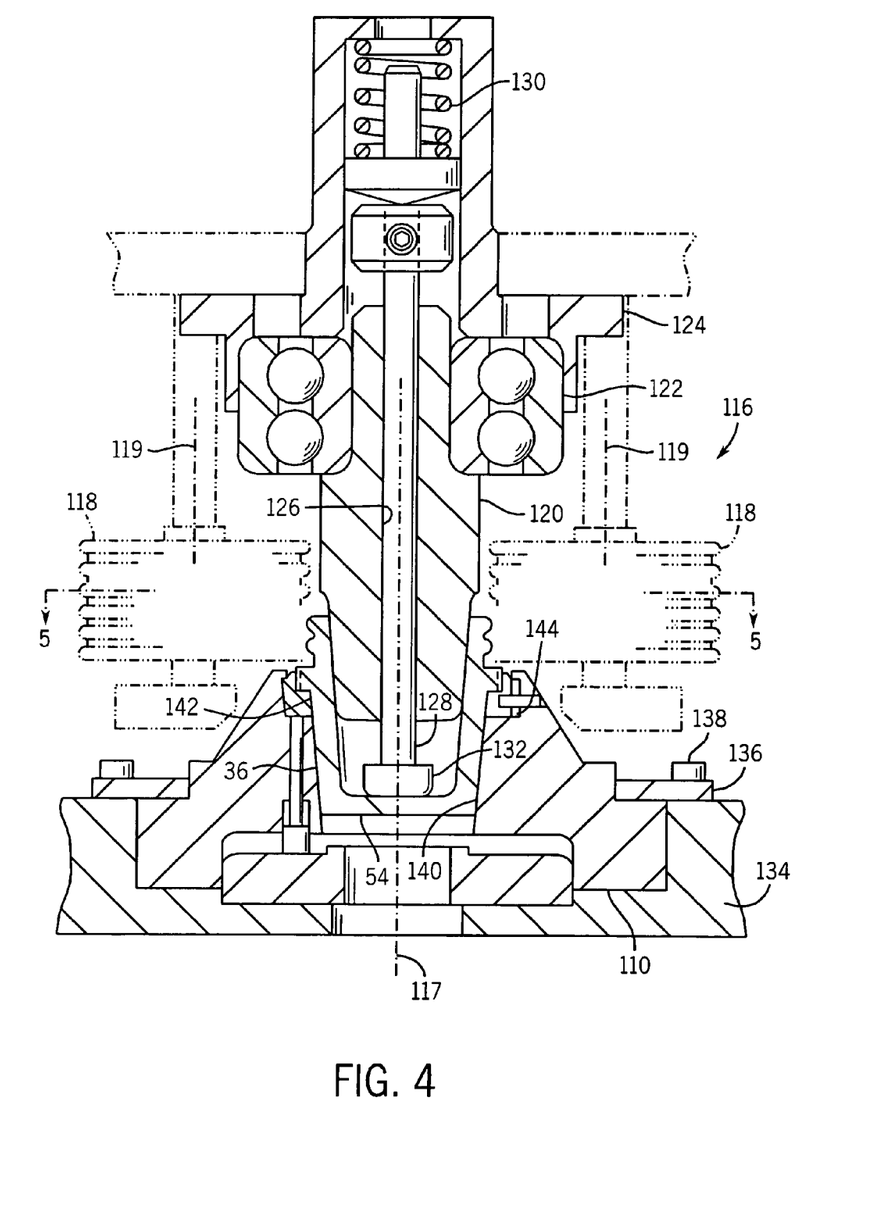
FIG. 4 is a cross-sectional view of the radial rolling spindle positioned to transform the annular rings on the partially finished battery terminal from their initial square cross-sectional shape into their desired arrowhead cross-sectional shape.

As shown in FIG. 4, radial rolling spindle 116 may include a plug member 120 supported for rotation by a ball bearing assembly 122. Ball bearing assembly 122 has an outer race which is secured in place by a clamping ring 124. Plug member 120 includes a bore 126 for receiving a rod 128 which is downwardly biased by a spring 130. The lower end of rod 128 includes a head 132 which engages flat wall 54 of semi-finished battery terminal 36 during the rolling process. Further details of the structure of radial rolling station 16 are provided in commonly owned U.S. Pat. No. 5,791,183 (see, in particular, FIGS. 17–23 and the accompanying text), the entire contents of which are hereby incorporated by reference.

Index die 110 used for holding battery terminal 36 during the rolling process is clamped to a base member 134 of circular index assembly 26 by an annular ring 136. Annular ring 136 is secured to base member 134 by a plurality of fasteners 138. Die 110 has an annular bore 140 with an enlarged diameter portion 142 at the top for receiving a split ring 144. Split ring 144 has an inner diameter that is substantially the same as the outer diameter of splined ring 40 to provide an interference fit that prevents battery terminal 36 from rotating during radial rolling. Preferably, the inner circumference of split ring 144 has a slight downwardly narrowing taper as well as a knurled inner surface to enhance the frictional interference fit when downward pressure is applied to battery terminal 36 during radial rolling. Additional or alternative means for preventing undesirable rotation of battery terminal 36 during radial rolling are provided in the aforementioned commonly owned U.S. Pat. No. 5,791,183 (see, in particular, FIGS. 17–23 and the accompanying text).

Referring now to FIGS. 5–9, the details of the radial rolling process used to transform annular rings 50 from their initial substantially rectangular cross-sectional shapes to their desired arrowhead cross-sectional shapes will be provided. To facilitate understanding of this process, a further explanation of the operation of radial rolling spindle 116 will first be provided.

During operation, radial rolling spindle 116 is continuously rotating in a clockwise direction about a central vertical axis 117 (see FIGS. 4 and 5) at a relatively high rate of speed. Thus, the three rollers 118 are revolving (or orbiting) about head 46 of battery terminal 36 at this high rate of speed. At the same time, each roller 118 is also rotating in a clockwise direction about its own vertical axis 119 at a relatively slow rate of speed. The entire radial rolling process requires a single 360° rotation of each roller 118 about its associated axis 119 to transform the annular rings 50 from their initial substantially rectangular cross-sectional shape into their desired substantially arrowhead cross-sectional shape. During this single rotation of each roller 118 about its individual axis 119, however, the roller 118 will have made multiple revolutions (or orbits) about central axis 118 and head 46.

For example, if each roller 118 is rotating about its individual axis 119 at 60 RPM, while the three rollers 118 are simultaneously revolving (or orbiting) about central axis 117 (and thus head 46) at 500 RPM, each roller 118 will complete about 8.3 orbits (=500/60) about head 46 during the single rotation of roller 118 needed to transform the annular ring to the desired shape. On the other hand, if each roller is rotating about its individual axis 119 at 30 RPM, while the three rollers 118 are simultaneously revolving (or orbiting) about central axis 117 (and thus head 46) at 600 RPM, each roller 118 will complete about 20 orbits (=600/30) about head 46 during the single rotation of roller 118 needed to transform the annular ring to the desired shape. Of course, persons skilled in the art will recognize that the use of different rotational speeds for radial rolling spindle 116 and individual rollers 118 will provide a different number of orbits for the manufacture of each battery terminal.

As shown in FIGS. 5–9, the outer circumference of each roller 118 includes a straight portion 146, a burnishing portion 148, an initial shaping portion 150, and a final shaping portion 154. The various portions of the outer circumference of each roller 118 may be in the form of a step function—that is, an abrupt transition may be utilized between each of the three portions. Alternatively, a smooth and gradual transition may be utilized between each of the three portions of the outer circumference.

Figure 5:
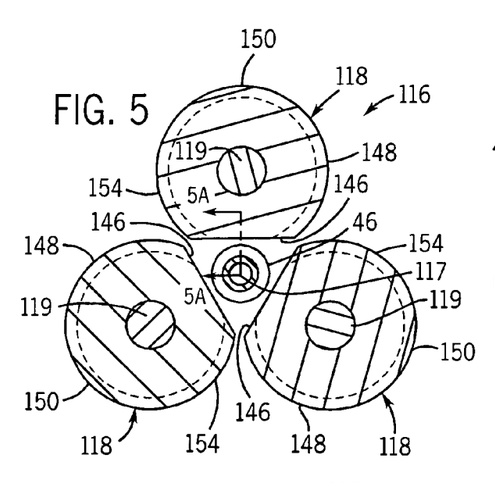
FIG. 5 is a cross-sectional view of the rollers of the radial rolling spindle taken along line 5—5 in FIG. 4 prior to radial rolling.
Figure 5A:
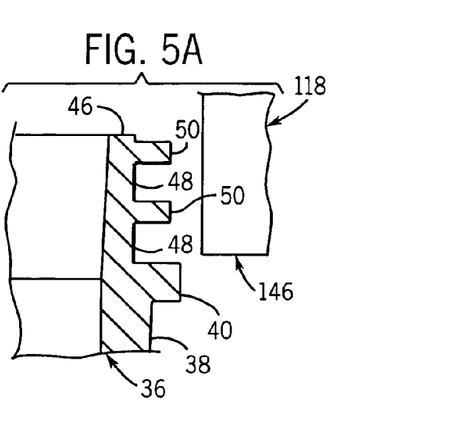
FIG. 5A is a cross-sectional view of the partially formed battery terminal and a straight portion of one of the rollers taken along line 5A—5A in FIG. 5.

Referring now to FIGS. 5 and 5A, it can be seen that straight portions 146 of rollers 118 permit radial rolling spindle 116 to be lowered into working position with the three rollers 118 surrounding head 46 of semi-finished battery terminal 36.

Figure 6:
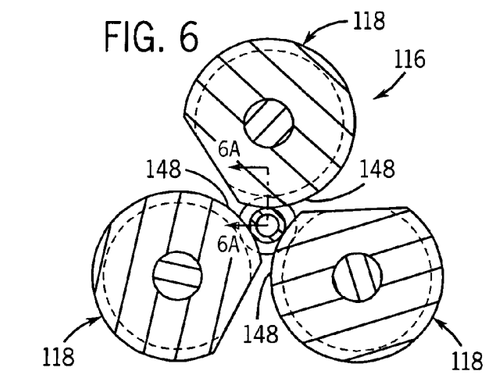
FIG. 6 is a cross-sectional view of the rollers of the radial rolling station taken along line 5—5 in FIG. 4 during a burnishing action.
Figure 6A:
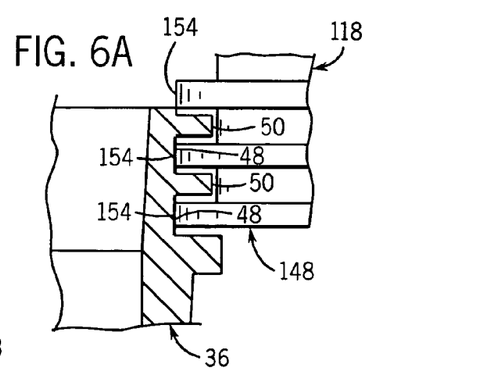
FIG. 6A is a cross-sectional view of the partially formed battery terminal and a burnishing portion of the roller taken along line 6A—6A in FIG. 6.

As each roller 118 continues its clockwise rotation about its associated axis 119, burnishing portion 148 removes any flash (or parting) lines on base diameter surface 48 of head 46 and also smoothes and polishes base diameter surface 48. As shown in FIGS. 6 and 6A, this burnishing action is provided by a plurality of rectangular (or similarly) shaped raised ridges 154 on each roller 118 configured to rub against base diameter surface 48 of head 46 between and below annular rings 50. If desired, burnishing portion 148 may also be configured to rub against and burnish other portions of batter terminal 36 such as rings 50 or splined ring 40. Preferably, burnishing portion 148 comprises about the first one third of the curved outer circumference of each roller 118.

Figure 7:
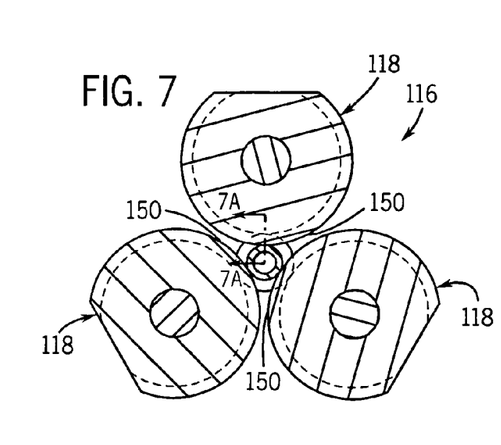
FIG. 7 is a cross-sectional view of the rollers of the radial rolling station taken along line 5—5 in FIG. 4 during an initial shaping action.
Figure 7A:
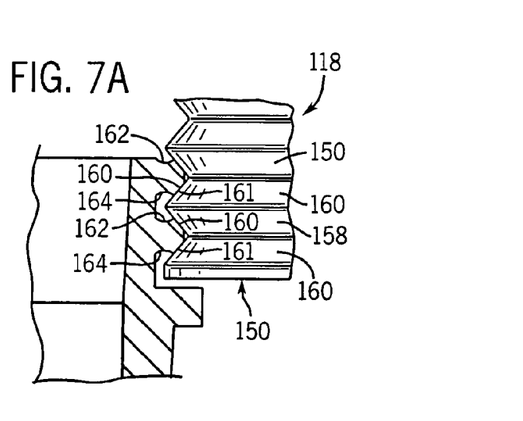
FIG. 7A is a cross-sectional view through the partially formed battery terminal and an initial shaping portion of the roller taken along line 7A—7A in FIG. 7.
Figure 9:
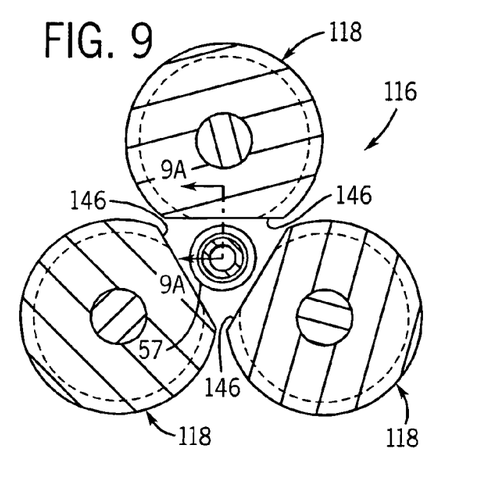
FIG. 9 is a cross-sectional view of the rollers of the radial rolling station taken along line 5—5 in FIG. 5 after completion of radial rolling.
Figure 9A:
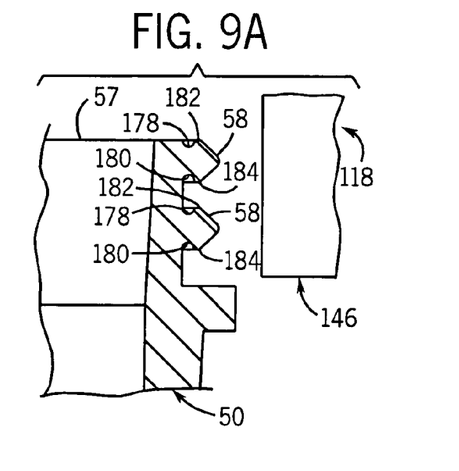
FIG. 9A is a cross-sectional view through the partially formed battery terminal and the straight portion of the roller taken along line 9A—9A in FIG. 9.

Turning now to FIGS. 7 and 7A, initial shaping portions 150 of rollers 118 begin to transform the two annular rings 50 from their initial rectangular cross-sectional shape (resulting from rectangular grooves 84 in split die 78) into their desired arrowhead cross-sectional shape (FIG. 9A). This initial shaping action is provided by a pair of triangular or V-shaped valleys 156, each of which is defined by a pair of angled sidewalls 158 configured to rub against upper and lower corners 160 and 161 of the associated annular ring 50. The sidewalls 158 of each valley 156 may be set at an angle relative to each other of between about 90° to about 120°, and preferably about 110°. Angled sidewalls 158 preferably extend sufficiently above and below the respective upper and lower sidewalls of annular rings 50 to provide upper and lower gaps 162 and 164, respectively, into which the material pushed from upper and lower corners 160 and 161 of annular rings 50 can flow. Preferably, the initial shaping portion 150 comprises about the second one third of the curved outer circumference of each roller 118.

Figure 8:
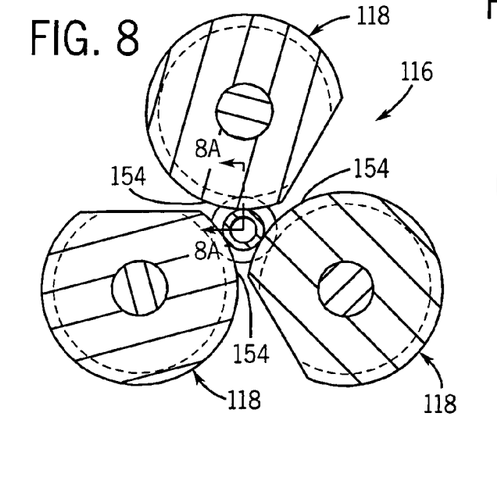
FIG. 8 is a cross-sectional view of the rollers of the radial rolling station taken along line 5—5 in FIG. 4 during a final shaping action.
Figure 8A:
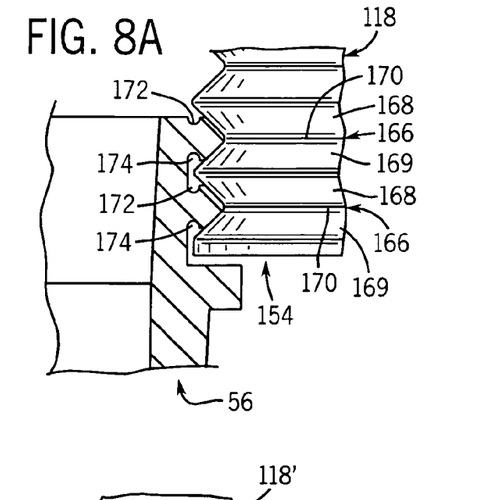
FIG. 8A is a cross-sectional view through the partially formed battery terminal and the final shaping portion of the roller taken along line 8A—8A in FIG. 8.

Referring now to FIGS. 8 and 8A, final shaping portions 154 of rollers 118 complete the transformation of annular rings 50 from their blunted arrowhead cross-sectional shape into the pointed arrowhead cross-sectional shape (FIG. 9A) of annular rings 58 on near-finished battery terminal 56. This final shaping action is provided by a pair of triangular or V-shaped valleys 166, each of which is defined by a pair of angled sidewalls 168 and 169 which intersect at a point 170. Valleys 166 on final shaping portions 154 have substantially the same configuration as valleys 156 on initial shaping portions 150, but the diameter of each roller 118 is increased for the final shaping portion to continue the shaping process. Once again, the angled sidewalls 168 and 169 of each valley 166 preferably extend sufficiently above and below the associated upper and lower sidewalls of annular rings 58 to provide upper and lower gaps 172 and 174, respectively, into which the material pushed from upper and lower corners of annular rings 58 can flow.

Figure 8B:
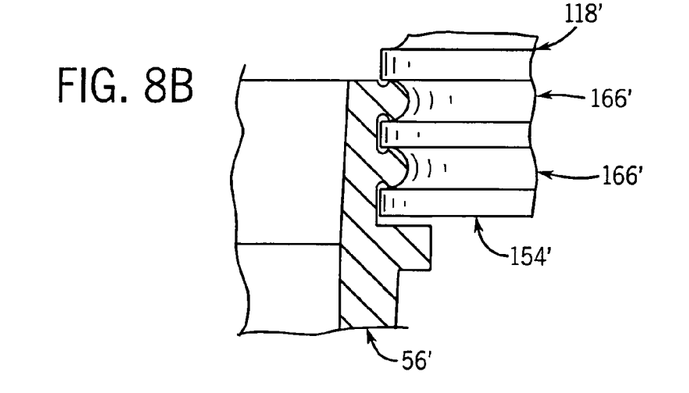
FIG. 8B is a cross-sectional view similar to FIG. 8A but showing an alternative embodiment of the roller and battery terminal.

Although the initial and final shaping portions 150 and 154 of rollers 118 are configured to transform annular rings 50 from their initial rectangular cross-sectional shape to a pointed arrowhead cross-sectional shape, persons skilled in the art will recognize that other shapes could easily be obtained with the present invention. For example, FIG. 8B shows an alternative roller 118' with a final shaping portion 154' including a plurality of semi-circular valleys 166'. Semi-circular valleys 166' are configured to rub against the upper and lower corners of annular rings 58' of a near-finished battery terminal 56' to cause the material thereof to flow into a mushroom head when viewed in cross-section.

FIGS. 9 and 9A show the angular positions of rollers 118 after each roller has completed one full rotation (i.e., 360°) about its associated axis 119. At this point, straight portion 146 of each roller 118 is facing towards head 57 of near-finished battery terminal 56 and thus radial rolling spindle 116 may be raised clear of battery terminal 56. As radial rolling spindle 16 is raised, spring biased rod 128 (see FIG. 4) ensures that near-finished battery terminal 56 remains seated in index die 110. Near-finished battery terminal 56 includes annular rings 58 which exhibit the desired arrowhead cross-sectional shape. Each annular ring 58 thus includes upper and lower undercuts 178 and 180 which provide corresponding upper and lower overhangs 182 and 184. Each undercut 178 and 180 preferably has a relatively small radius of curvature, such as between about 0.10 to 0.30 inches, and even more preferably about 0.015 inches.

Figure 10:
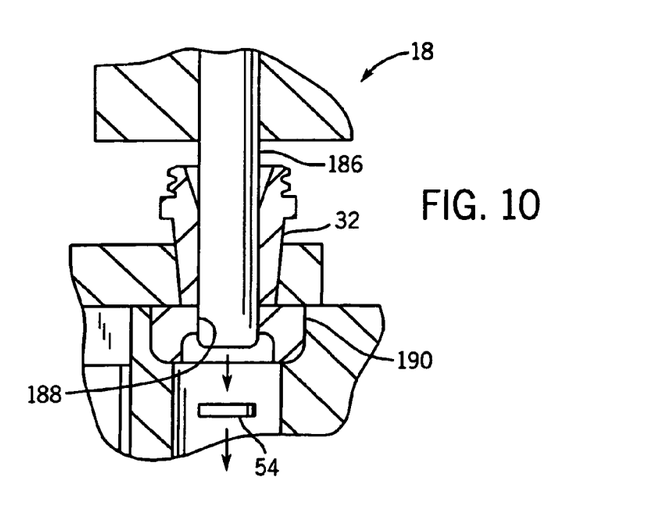
FIG. 10 is a cross-sectional view of the punching station.
Figure 11F:
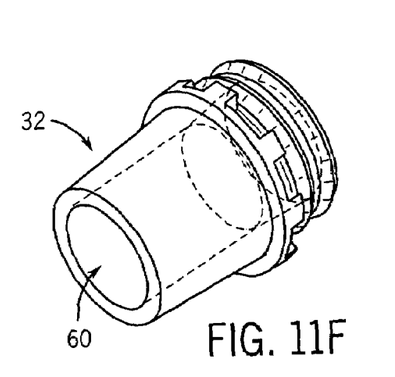
FIG. 11F is an isometric view of a finished battery terminal after punching out the bottom wall to form a through hole.

Referring back to FIG. 1, upon completion of radial rolling the index assembly 26 positions near-finished battery terminal 56 in through punch station 18. As shown in FIG. 10, through punch station 18 includes a through punch 186 aligned with an opening 188 of anvil 190. When punch station 18 is activated, punch 186 removes flat bottom wall 56 from near-finished battery terminal 56 (FIG. 11D) to produce finished battery terminal 32 (FIG. 11F).

It is important to note that the above-described preferred embodiments of the apparatus and method for cold forming a ring on a lead battery terminal are illustrative only. Although only certain embodiments have been described above in detail, those skilled in the art will appreciate that many modifications are possible without materially departing from the novel teachings and advantages of the subject matter described herein. For example, although radial rolling spindle 116 made use of three rollers 118 were for radial rolling, a lesser or greater number of rollers (e.g., one, two or four) could have been used in performing the claimed process. In addition, although the annular rings were initially formed on the battery terminal by means of split die 78, the annular rings could have been formed by means of a unitary die or any other known hot or cold forming process. For example, a first radial rolling operation could have been used to raise the annular rings with rectangular cross-sections on the battery terminal as disclosed in the above-identified U.S. Pat. No. 5,791,183 (incorporated by reference above), and a second radial rolling operation as described above could then have be used to transform the annular rings into their desired arrowhead cross-sectional shape. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. An apparatus for forming at least one ring with an undercut or overhang on a battery terminal, the apparatus comprising:

a fixture configured to securely position the battery terminal;

a rolling station including a cold metal forming member configured to transform at least one ring on the battery terminal from having a first shape into a second different shape with an undercut or overhang when the battery terminal and cold metal forming member are rotated relative to each other, wherein the first shape of the ring includes a inner portion having a first width being at least as wide as a second width of the outer portion of the ring; and a drive assembly configured to rotate the battery terminal and cold metal forming member relative to each other.

2. The apparatus of claim 1, wherein the second shape of the at least one ring is an arrowhead in cross-section.

3. The apparatus of claim 1, wherein the at least one ring is a pair of rings.

4. The apparatus of claim 1, wherein the cold metal forming member includes at least one roller.

5. The apparatus of claim 4, wherein the at least roller is a cam including an outer circumference having a burnishing portion.

6. The apparatus of claim 4, wherein the at least roller is a cam including an outer circumference having a shaping portion with at least one valley including a pair of sidewalls set at an angle of between about 90° to about 120° relative to each other.

7. The apparatus of claim 4, wherein the at least one roller comprises a plurality of rollers spaced equally about an outer surface of the battery terminal.

8. The apparatus of claim 7, wherein each of the plurality of rollers includes an outer circumference having a straight portion.

9. A method for forming at least one ring with an undercut or overhang on a battery terminal, the method comprising:
  securing the battery terminal within a fixture; and
  engaging a cold metal forming member with an outer surface of the battery terminal while the cold metal forming member and the battery terminal are rotating relative to each other;
  transforming at least one ring on the battery terminal from having a first shape into a second different shape with an undercut or overhang, wherein the first shape of the ring includes a inner portion having a first width being at least as wide as a second width of the outer portion of the ring.

10. The method of claim 9, wherein the engaging step includes contacting the outer surface of the battery terminal with at least one roller.

11. The method of claim 10, wherein the engaging step includes contacting the outer surface of the battery terminal with a plurality of rollers positioned at equally spaced locations around the outer surface of the battery terminal.

12. The method of claim 11, wherein the plurality of rollers are configured to revolve about the battery terminal at a first rate of speed while each roller is configured to rotate about its own axis at a second rate of speed.

13. The method of claim 12, wherein the transformation step is accomplished by a single rotation of each of the plurality of rollers about its own axis.

14. The method of claim 12, wherein the first speed is higher than the second rate of speed.

15. The method of claim 14, wherein the first rate of speed is between about 500 to about 600 RPM while the second rate of speed is between about 20 to about 30 RPM.

16. The method of claim 9, wherein the transforming step is accomplished without substantially removing any material from the at least one ring.

17. The method of claim 9, further including the step of cold pressing the battery terminal from a slug into a semi-finished shape including the annular rings having the first cross-sectional shape prior to the engaging step.

* * * * *